(12) United States Patent
Sundaresan et al.

(10) Patent No.: US 11,381,405 B1
(45) Date of Patent: Jul. 5, 2022

(54) SYSTEM AND METHOD FOR AUTHENTICATING A USER AT A RELYING PARTY APPLICATION USING AN AUTHENTICATION APPLICATION AND AUTOMATICALLY REDIRECTING TO A TARGET APPLICATION

(71) Applicant: Workday, Inc., Pleasanton, CA (US)

(72) Inventors: Prakash Sundaresan, Redmond, WA (US); Aneesh Sandeep Verenkar, San Jose, CA (US); Lionello G. Lunesu, Peng Chau (HK); Krishnan Rajiyah, El Dorado Hills, CA (US); Kamalanathan Thandapani, Livermore, CA (US); Keith Kowal, Pleasanton, CA (US); Amit Jasuja, Pleasanton, CA (US)

(73) Assignee: Workday, Inc., Pleasanton, CA (US)

( * ) Notice: Subject to any disclaimer, the term of this patent is extended or adjusted under 35 U.S.C. 154(b) by 169 days.

(21) Appl. No.: 16/854,466

(22) Filed: Apr. 21, 2020

Related U.S. Application Data (60) Provisional application No. 62/839,370, filed on Apr. 26, 2019.

(51) Int. Cl.
| | |
|---|---|
| *H04L 9/40* | (2022.01) |
| *H04L 9/32* | (2006.01) |
| *G06F 21/31* | (2013.01) |
| *H04L 9/08* | (2006.01) |

(52) U.S. Cl.
CPC .......... *H04L 9/3271* (2013.01); *G06F 21/31* (2013.01); *H04L 9/0869* (2013.01); *H04L 9/3231* (2013.01); *H04L 63/083* (2013.01); *H04L 63/0884* (2013.01); *G06F 2221/2103* (2013.01)

(58) Field of Classification Search
CPC ... H04L 9/3271; H04L 9/0869; H04L 9/3231; H04L 63/083; H04L 63/0884; G06F 21/31; G06F 2221/2103
See application file for complete search history.

(56) References Cited

U.S. PATENT DOCUMENTS

| | | | |
|---|---|---|---|
| 2015/0180863 A1* | 6/2015 | Kobayashi | H04L 63/0807 726/9 |
| 2015/0365348 A1* | 12/2015 | Matsuda | H04L 67/10 709/225 |
| 2018/0040064 A1* | 2/2018 | Grigg | G06N 5/022 |
| 2018/0145967 A1* | 5/2018 | Matsugashita | H04L 9/3213 |
| 2019/0069168 A1* | 2/2019 | Belote | G06F 21/41 |
| 2020/0314205 A1* | 10/2020 | Cheng | G06F 9/451 |

* cited by examiner

*Primary Examiner* — Thaddeus J Plecha
(74) *Attorney, Agent, or Firm* — Van Pelt, Yi & James LLP (57) ABSTRACT

A system for authenticating a user at a relying party application using an authentication application and automatically redirecting to a target application includes a processor. The processor is configured to 1) make an API call that comprises (i) an authentication challenge that corresponds to an authentication request and (ii) a call back URL that is specified by a relying party application; 2) retrieve at least one of a target application link or a null value from a table; 3) authenticating the user based on an authentication challenge response to the at least one authentication challenge; and 4) invoking the target application link from the table to automatically redirect from the authentication application to the target application specified in the target application link.

15 Claims, 10 Drawing Sheets

| RELYING PARTY APPLICATION 402 | CALL BACK URLS 404 | APPLICATION LINKS 406 |
|---|---|---|
| FIRST APPLICATION TYPE | CALL_BACK_URL 1 | FIRST APPLICATION LINK |
| SECOND APPLICATION TYPE | CALL_BACK_URL 2 | SECOND APPLICATION LINK |

SYSTEM AND METHOD FOR AUTHENTICATING A USER AT A RELYING PARTY APPLICATION USING AN AUTHENTICATION APPLICATION AND AUTOMATICALLY REDIRECTING TO A TARGET APPLICATION

This application claims priority to U.S. Provisional Patent Application No. 62/839,370 entitled SYSTEM AND METHOD FOR AUTHENTICATING A USER AT A RELYING PARTY APPLICATION USING AN AUTHENTICATION APPLICATION AND AUTOMATICALLY REDIRECTING TO A TARGET APPLICATION filed Apr. 26, 2019 which is incorporated herein by reference for all purposes.

BACKGROUND OF THE INVENTION

Mobile applications require user authentication to enable users to access them, which is typically done using credentials, e.g., a username and password. Since it is cumbersome for users to create credentials for each application, many applications rely on user credentials from a third-party application for authentication, in order to make it easier for the user to avoid having to create a new set of credentials. These applications are called relying party applications. These user credentials may be stored as cookies in a browser and can be retrieved and used by each relying party application to automatically login to a corresponding mobile application. However, there is a risk these cookies can be accessed by malware in order to access the relying party application and perform unauthorized transactions on the corresponding mobile application improperly accessed with the relying party application.

One way to reduce this risk to use a separate application for authentication, such as a Digital Identity Wallet application or a third-party application, e.g., Facebook. When the user initiates an authentication or authorization request from a relying party application, it may be received in the other application that is used to authenticate the user, typically using a notification system. After the user inspects and confirms the request, usually the user has to manually switch back to the original relying party application to continue. This is an extra step that represents friction (inefficiency) for the user. Accordingly, there remains need for a system and method for authenticating the user that has fewer steps, without compromising on security.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments.

A system for authenticating a user at a relying party application using an authentication application and automatically redirecting to a target application is disclosed. The system comprises a processor. The processor is configured to 1) make an API call that comprises (i) at least one authentication challenge that corresponds to an authentication request or an authorization request from the user at the relying party application and (ii) a call back URL that is specified by the relying party application; 2) retrieve at least one of a target application link or a null value from a table, wherein the target application link or the null value corresponds to the call back URL—for example, the table comprises a first application link of N application links that corresponds to a first call back URL of N call back URLs, a second application link that corresponds to a second call back URL, where the call back URL comprises a target application link or a null value; 3) conditionally authenticating the user based on an authentication challenge response to the at least one authentication challenge, wherein the conditionally authenticating comprises at least one of approving or denying the authentication request or the authorization request; and 4) conditionally invoking the target application link from the table to automatically redirect from the authentication application to the target application specified in the target application link, where conditionally refers to invoking the target application link in the event that the target response is not null.

There remains a need for a system and method for authenticating a user to a relying party application that has fewer steps, without compromising on security. Referring now to the drawings, and more particularly to FIGS. 1 through 9, preferred embodiments are shown, where similar reference characters denote corresponding features consistently throughout the figures.

Figure 1:
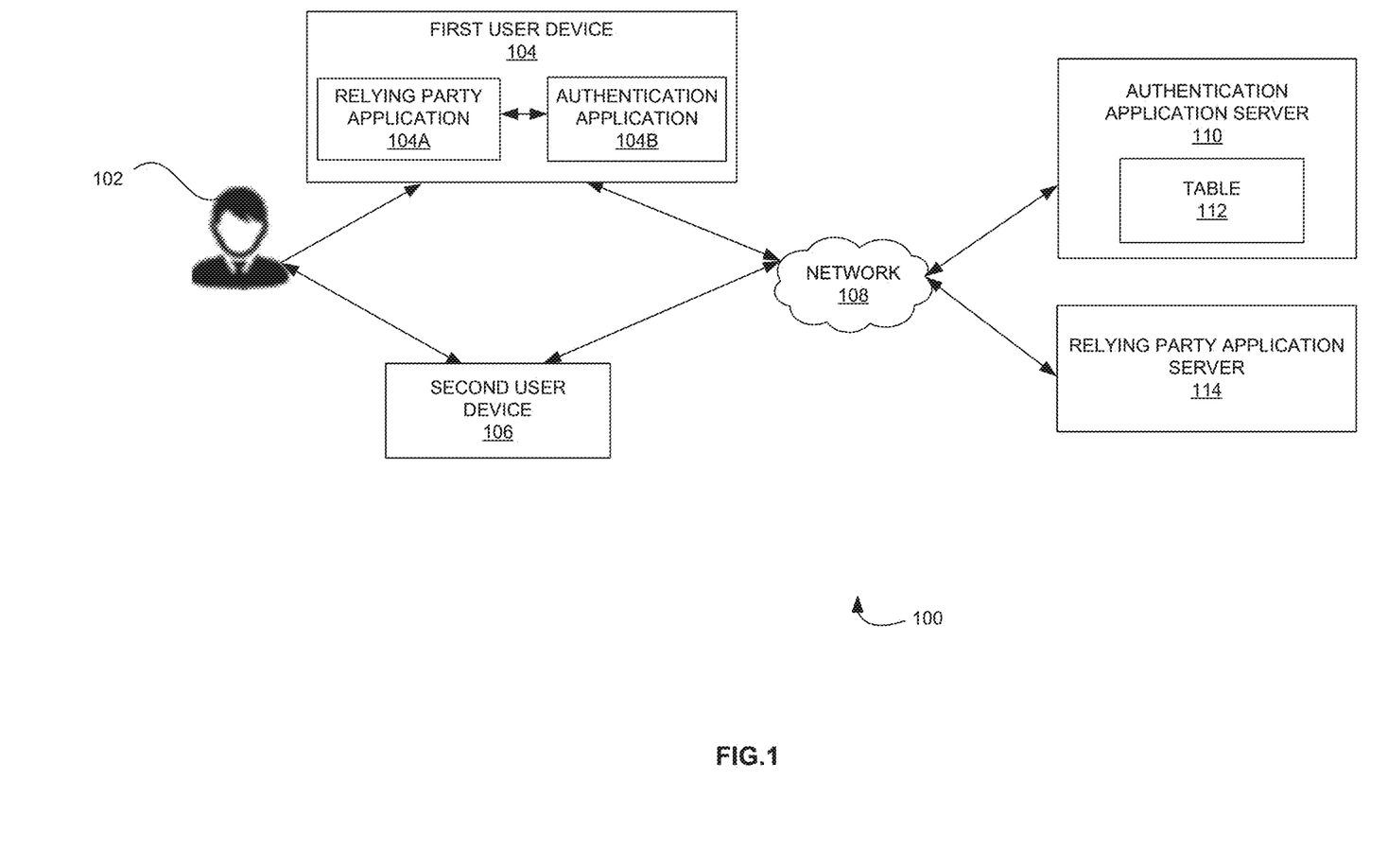
FIG. 1 is a block diagram 100 illustrating an embodiment of a system that authenticates a user 102 to a relying party application 104A using an authentication application 104B in a first user device 104.

FIG. 1 is a block diagram 100 illustrating an embodiment of a system that authenticates a user 102 to a relying party application 104A using an authentication application 104B in a first user device 104 according to some embodiments herein. The block diagram 100 includes the user 102, the first user device 104, a second user device 106, a network 108, an authentication application server 110 and a relying party application server 114. The first user device 104, without limitation, may be a mobile device that includes a cryptographic processor. The first user device 104, without limitation, may be selected from a mobile phone, a Personal Digital Assistant (PDA), a tablet, a desktop computer, or a laptop. The second user device 106 is an electronic device that can access a relying party service via a browser. The second user device 106, without limitation, may be selected from a mobile phone, a Personal Digital Assistant (PDA), a tablet, a desktop computer, or a laptop. The first user device 104 may include one or more relying party applications and one or more authentication applications. The authentication application 104B may be any application that the user 102 has already registered his/her credentials with. The relying party application 104A is associated with a relying party and may be any application that permits user authentication based on credentials that are registered with the authentication application 104B. In some embodiments, the relying party comprises a company (e.g., a travel business—for example, Expedia or Airbnb) that has an associated application and/or website, which the user is seeking to engage with. In some embodiments, the authentication application 104B is a Digital Identity Management (DIM) application.

The authentication application 104B may be embedded in a third-party application, e.g., Facebook, Gmail, Twitter, etc. Authentication application server 110 comprises an application server for communicating with authentication application 104B, storing data for authentication application 104B, etc. In some embodiments, authentication server 110 comprises table 112.

In some embodiments, the relying party application 104A specifies an application link that specifies a custom Uniform Resource Locator (URL) scheme, e.g., iOS Universal Links or Android Deep Links that send the user 102 directly to an application, e.g., Facebook, Twitter, instead of a website or a store if the application is already installed in the first user device 104. The application link may match one or more web pages to one or more locations in-app. In some embodiments, the application link is at least one of: (i) an iOS Universal Link or (ii) an Android Deep Link. In some embodiments, when the user 102 opens a web page with the first user device 104 which is matched as described, iOS automatically redirects the user 102 to the application. In some embodiments, the Android Deep Link is based on website URL that has been verified to belong to a website. In some embodiments, the Android Deep Link opens the application when the user 102 clicks the URL.

In some embodiments, the relying party application 104A specifies a callback URL that specifies a URL of an endpoint that is designated to receive an authorization code on behalf of the relying party application (e.g., the relying party application 104A). In some embodiments, the call back URL notifies the relying party application of the result of the authentication or authorization request (e.g. success/failure), and in the case of success, any requested identity claims are also returned to the call-back URL.

The relying party application 104A specifies the application link, e.g., a first application link or a second application link that corresponds to the call back URL, e.g., a first call back URL, a second call back URL or a third call back URL, and registers the application link that corresponds to the call back URL in a table 112 accessible to the authentication application 104B. In some embodiments, the authentication application 104B stores the table 112 at the authentication application server 110, however, the table 112 can be stored at the first user device 104. In some embodiments, the relying party application 104A specifies the application link in a communication directly to authentication application 104B, e.g., as part of an API call.

In some embodiments, the relying party application 104A specifies at least one of the first application link that corresponds to the first call back URL and the second application link that corresponds to the second call back URL. In some embodiments, the first application link is the iOS Universal Link for an iOS application, and the second application link is an Android Deep Link for an Android application. In some embodiments, the relying party application 104A registers the first application link that corresponds to the first call back URL and the second application link that corresponds to the second call back URL in the table 112 accessible to the authentication application 104B. In some embodiment s, the relying party application 104A determines a target application as specified in a target application link. The target application may be a second application associated with the relying party application 104A or may be another third-party application that is in communication with the first user device 104 using network 108. In one example, the relying party application 104A may be travel application like Expedia that may be a payment application, which enables the user 102 to make payment for booking rooms in Expedia. Expedia.com is a travel booking website.

In some embodiments, the relying party application 104A specifies a null value that corresponds to the third call back URL and registers the null value that corresponds to the third call back URL in the table 112. In some embodiments, the third call back URL corresponds to the application type being a browser. When the user 102 accesses the relying party application 104A from the browser, e.g., Google Chrome, Mozilla Firefox, Internet explorer, Microsoft Edge, etc., in: (i) the first user device 104 associated with the user 102, e.g., a mobile phone with the cryptographic processor or (ii) the second user device 106 associated with the user 102, e.g., a Personal Computer, the null value corresponding to the third call back URL is retrieved, and hence the authentication application 104B does not have to redirect to any other application. The relying party application 104A creates a 1-1 mapping for each application link and the corresponding call back URL. In some embodiments, the relying party application 104A creates the 1-1 mapping for the call back URL and the corresponding application link. In some embodiments, the table 112 includes one or more call back URLs that corresponds to one or more application links. In some embodiments, the table 112 includes the one or more application links that corresponds to the one or more call back URLs.

The user 102 may login to the relying party application 104A, e.g., Expedia using at least one of (i) a username and a password or (ii) the authentication application 104B which may be the Digital Identity Management (DIM) application or the third-party application, e.g., Facebook, Gmail, Twitter, etc. at the first user device 104. The user 102 may click the authentication application 104B, e.g., the Digital Identity Management (DIM) application to access the relying party application 104A. The relying party application server 114 conditionally verifies the username and the password that is obtained from the user 102 with a previously registered username and a password that are stored in the relying party application server 114 if the user 102 logs the relying party application 104A using the username and the password.

In some embodiments, the user 102 initiates an authentication request or an authorization request for authentication or authorization at the relying party application 104A, e.g., Expedia. In some embodiments, the authentication includes validating credentials of the user 102 such as a User Name/User Identification (User ID) and a password to verify an identity of the user 102. In some embodiments, the authentication application server 110 or the relying party application server 114 authenticates the user 102 by verifying the credentials of the user 102. For example, commercial websites such as Amazon.com may require the user 102 to login before buying products so they know exactly who their purchasers are.

In some embodiments, the authorization enables the user 102 to access resources such as information, files, databases, funds, or locations, when the authentication application server 110 or the relying party application server 114 authenticates the user 102. For example, students may be required to authenticate before accessing a Student Link. The authorization step enables them to access only resources they are authorized to access, and prevents the students from seeing data of other students.

In some embodiments, the relying party application 104A specifies the authentication request or the authorization request in an application programming interface (API) call. The relying party application 104A makes the API call that includes: (i) at least one authentication challenge that corresponds to the authentication request or the authorization request from the user 102 at the relying party application 104A and (ii) the call back URL, e.g., the first call back URL, the second call back URL, or the third call back URL, that is specified by the relying party application 104A. In some alternative embodiments, the relying party application 104A makes the API call based on an authentication protocol layered on an authorization protocol. In some embodiments, the authentication protocol is an OpenID Connect protocol and the authorization protocol is an OAuth 2.0 protocol supported by the OpenID Foundation. OpenID Connect is a simple identity layer on top of the OAuth 2.0 protocol, which allows computing clients to verify an identity of the user 102 based on the authentication performed by the authorization application server 110, as well as to obtain basic profile information about the user 102 in an interoperable and Representational State Transfer-like (REST-like) manner The OpenID Connect specifies a Representational State Transfer-ful (RESTful) HyperText Transfer Protocol Application Programming Interface (HTTP API), using JavaScript Object Notation (JSON) as a data format.

In some embodiments, an open authorization (OAuth) enables the user 102 to access other websites, e.g., Expedia.com using an account of the user 102 in the HTTP service, e.g., Google, Facebook, Microsoft, or Twitter, without sharing credentials of the user 102. In some embodiments, the authorization protocol includes the call back URL, e.g., the first call back URL, the second call back URL, or the third call back URL and at least one parameter. In some embodiments, the at least one parameter is selected from (i) an API authorization endpoint, (ii) a client ID, (iii) a response type and (iv) a scope.

An example Open Authorization (OAuth) specification of the relying party application 104A is:
https://cloud.trustedkey.com/v1/oauth/authorize?response_type=code&client_id=CLIEN TID&redirect_uri=CALLBACK_URL&scope=read.

Another example Open Authorization (OAuth) specification of the relying party application 104A is:
https://cloud.digitalocean.com/v1/oauth/authorize?response_type=code&client_id=CLIENT_ID& redirect_uri=CALLBACK_URL&scope=read In some embodiments, https:// cloud.trustedkey.com/v1/oauth/authorize, specifies the application programming interface (API) authorization endpoint. In some embodiments, an endpoint is the uniform resource locator (URL) on a web server. In some embodiments, the endpoint may be an authorization endpoint, a token endpoint and/or a redirection endpoint. The authorization endpoint is the endpoint on an authorization server where a resource owner logs in and grants authorization to a user application. The authorization endpoint may be used to request tokens or authorization codes via the browser. The token endpoint is the endpoint on the authorization server where the user application exchanges the authorization code, client ID and client secret, for an access token. The token endpoint may be used to programmatically request the tokens. The redirect endpoint is the endpoint in the user application where the resource owner is redirected to, after having granted authorization at the authorization endpoint. In some embodiments, the authorization endpoint and the token endpoint are located on the authorization server.

The client ID specifies how the API identifies the client application. A redirect_uri=CALLBACK_URL is where the authentication application 104B redirects the user 102 after an authorization code is granted. The response_type=code specifies that the user application is requesting an authorization code grant. The scope=read specifies level of access that the application is requesting.

An example pseudo code for the relying party application 104A:

```
If (need_to_switch_back_to_RP_app)// e.g., calling from iOS or Android app {
    // supply appropriate call-back URL so DIW can switch back to correct RP app If (iOS)
    OAuth_call (params, call_back_URL2); Else if (Android)
    OAuth_call (params, call_back_URL3);}
Else // e.g., calling from desktop browser {
    OAuth_call (params, call_back_URL1);
}
```

The authentication application 104B retrieves at least one of: (i) the target application link; or (ii) the null value from the table 112 that is stored in the authentication application server 110. The target application link or the null value corresponds to the call back URL. In some embodiments, the target application link is the application link that corresponds to the relying party application 104A.

In some embodiments, the authentication application server 110 receives the API call that includes the authentication request or the authorization request from the relying party application 104A. The authentication application server 110 verifies if the user 102 has sent the authentication or the authorization request by sending the at least one authentication challenge to the user 102 at the authentication application 104B, e.g., the Digital Identity Management (DIM) application through the network 108. In some embodiments, the network 108 is a wired network. In some embodiments, the network 108 is a wireless network. In some embodiments, the at least one authentication challenge is at least one cryptographic challenge.

In some embodiments, the authentication application 104B, e.g., the Digital Identity Management (DIM) application, displays the at least one authentication challenge received from the authentication application server 110 at a corresponding account of the user 102 which is previously created or registered by the user 102 in the authentication application 104B.

The user 102 may approve or deny the at least one cryptographic challenge at the authentication application 104B, e.g., the Digital Identity Management (DIM) application. In some embodiments, the at least one cryptographic challenge includes or is derived from a pseudorandom value. The authentication application 104B includes a first set of credentials that includes a public-private key pair associated with the user 102. In some embodiments, the first user device 104 includes the cryptographic processor that generates the first set of credentials. The public-private key pair includes a user public key and a user private key. In some embodiments, a number of bits, e.g., 256 bits in the user public key and 256 bits in the user private key may be based on an algorithm used in the cryptographic processor of the first user device 104. In some embodiments, the user private key is restricted to the cryptographic processor on the first user device 104.

In some embodiments, the authentication application 104B receives the cryptographic challenge, which includes the pseudorandom value, from the relying party application 104A. In some embodiments, the authentication application 104B performs the cryptographic operation on the at least one cryptographic challenge for responding to the at least one cryptographic challenge. In some embodiments, the authentication application 104B performs the cryptographic operation on the at least one cryptographic challenge for responding to the at least one cryptographic challenge may include signing the pseudorandom value with the user private key.

In some embodiments, the authentication application 104B performs the at least one cryptographic operation on the at least one cryptographic challenge for responding to the at least one cryptographic challenge includes encrypting the pseudorandom value. In some embodiments, the authentication application 104B performs the at least one cryptographic operation on the at least one cryptographic challenge for responding to the at least one cryptographic challenge includes signing the pseudorandom value with the user private key.

The authentication application 104B verifies at least one of a biometric or a Personal Identification Number (PIN) code by comparing the at least one of the biometric or the PIN code with at least one of a previously registered biometric associated with the user 102 or a previously registered PIN code associated with the user 102 that is stored in the authentication application server 110, and if the at least one of the biometric or the PIN code matches the at least one of the previously registered biometric associated with the user 102 or the previously registered PIN code associated with the user 102, the user private key is made available for executing at least one cryptographic operation. In some embodiments, the biometric of the user 102 may include: (i) a fingerprint scan of the user 102; (ii) a facial feature scan of the user 102; (iii) an iris scan of the user 102; and/or a retina scan of the user 102.

The authentication application 104B responds to the at least one cryptographic challenge by performing the at least one cryptographic operation on the cryptographic challenge using the user private key to form a result of the at least one cryptographic operation. The authentication application 104B transmits the result of the at least one cryptographic operation as a cryptographic challenge response to the authentication application server 110. In some embodiments, the result of the at least one cryptographic operation performed on the at least one cryptographic challenge includes an encrypted pseudorandom value. In some embodiments, the authentication application server 110 decrypts the encrypted pseudorandom value from the cryptographic challenge response to obtain the pseudorandom value. In some embodiments, the result of the at least one cryptographic operation performed on the at least one cryptographic challenge includes a signed pseudorandom value. In some embodiments, the authentication application server 110 verifies a signature of the pseudorandom value from the cryptographic challenge response.

In some embodiments, the authentication application 104B and at least one of the relying party application 104A or the browser display a unique code and details of a relying party to the user 102 to ensure that only the user 102 only responds to an authentication or the authorization request initiated by the user 102.

In one example embodiment, when the user 102 logs on to the relying party application 104A using the third-party application, e.g., Facebook, the relying party application 104A, e.g., Expedia makes the API call that includes the authentication request to a third-party application server. In some embodiments, the third-party application server sends a verification notification to a corresponding account of the user 102 at the third-party application, e.g., Facebook account of the user 102. The user 102 may accept the verification notification by logging in to the corresponding third-party application, using the username and the password or the user 102. In some embodiments, the third-party application server, e.g., Facebook may verify the username and the password that is obtained from the user 102 with a previously registered username and a password that are stored in the third-party application server.

The authentication application 104B conditionally authenticates the user 102 at the relying party application 104A based on the authentication challenge response to the at least one authentication challenge. In some embodiments, the authentication is approved in response to a valid authentication challenge response. In some embodiments, the authentication is not approved in response to an invalid authentication challenge response. The authentication application 104B conditionally invokes the application link from the table 112 to automatically redirect from the authentication application 104B, e.g., Expedia to the target application specified, e.g., the relying party application 104A in the target application link. In some embodiments, the redirection is performed in response to a valid authentication challenge response. In some embodiments, the redirection is not performed in response to an invalid authentication challenge response.

In some embodiments, the authentication application 104B may not redirect or switch back to the relying party application 104A if the relying party application 104A is being accessed from the browser in at least one of (i) the first user device 104 associated with the user 102 or (ii) the second user device 106 associated with the user 102. In some embodiments, the authentication application 104B may not redirect or switch back to the relying party application 104A if the relying party application 104A is being accessed from the second user device 106 associated with the user 102.

An example pseudo code for the authentication application 104B is: . . . // complete OAuth authentication/authorization processing Application_Link al=lookup_UL_Table (OAuth_call_back_URL) If (al!=NULL)

Invoke (al) // switch back to app represented by Application Link al

// else no need to switch back

Figure 2:
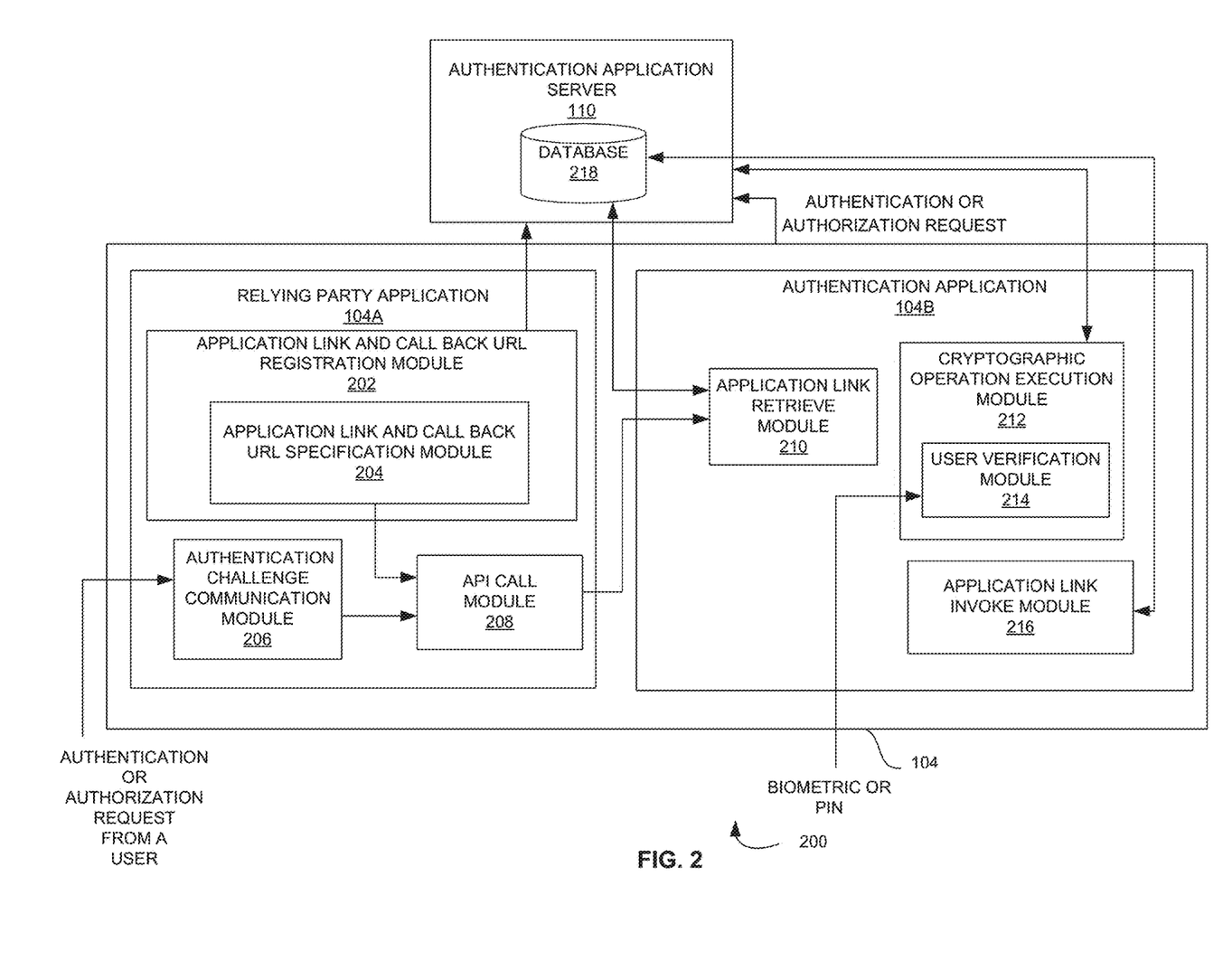
FIG. 2 is a block diagram 200 illustrating an embodiment of the first user device 104.

FIG. 2 is a block diagram 200 illustrating an embodiment of the first user device 104 according to some embodiments herein. The first user device 104 includes the relying party application 104A and the authentication application 104B. The relying party application 104A includes an application link and call back URL registration module 202, an authentication challenge communication module 206 and an API call module 208. The application link and call back URL registration module 202 includes an application link and call back URL specification module 204. The authentication application 104B includes an application link retrieve module 210, a cryptographic operation execution module 212, and an application link invoke module 216. The cryptographic operation execution module 212 includes a user verification module 214.

The application link and call back URL specification module 204 specifies a first application link that corresponds to a first call back Uniform Resource Locator (URL) and a second application link that corresponds to a second call back URL. In some embodiments, the application link and call back URL specification module 204 specifies the first application link that corresponds to the first call back URL (e.g., for a first application type) and the second application link that corresponds to the second call back URL (e.g., for a second application type). In some embodiments, the application link and call back URL specification module 204 specifies a null value that corresponds to a third call back URL if the relying party application 104A is being accessed from a browser in at least one of (i) the first user device 104 associated with the user 102 or (ii) the second user device 106 associated with the user 102.

The application link and call back URL registration module 202 registers the first application link that corresponds to the first call back URL and the second application link that corresponds to the second call back URL in the table 112 accessible to the authentication application server 110. The authentication application server 110 stores the table 112 in a database 218. In some embodiments, the application link and call back URL registration module 202 registers the first application link that corresponds to the first call back URL (e.g., for the first application type) and the second application link that corresponds to the second call back URL (e.g., for the second application type) in the table 112. In some embodiments, the table 112 includes one or more call back URLs that corresponds to one or more application links. In some embodiments, the table 112 includes the one or more application links that corresponds to the one or more call back URLs.

The authentication challenge communication module 206 obtains an authentication or an authorization request from the user 102 at the relying party application 104A. The API call module 208 makes an API call that includes (i) the at least one authentication challenge that corresponds to the authentication or the authorization request from the user 102 at the relying party application 104A and (ii) the call back URL that is specified by the relying party application 104A. In some embodiments, the relying party application 104A makes the API call based on an authentication protocol layered on an authorization protocol.

The application link retrieve module 210 retrieves at least one of (i) a target application link or (ii) a null value from the table 112. The target application link or the null value corresponds to the call back URL.

In some embodiments, the authentication application 104B sends the authentication or the authorization request from the user 102 to the authentication application server 110. In some embodiments, the cryptographic operation execution module 212 receives the at least one cryptographic challenge, which includes a pseudorandom value, from the authentication application server 110. In some embodiments, the cryptographic operation execution module 212 performs at least one cryptographic operation on the at least one cryptographic challenge for responding to the at least one cryptographic challenge. In some embodiments, the cryptographic operation execution module 212 performs the at least one cryptographic operation on the at least one cryptographic challenge for responding to the at least one cryptographic challenge may include signing the pseudorandom value with the user private key.

The user verification module 214 verifies at least one of a biometric or a Personal Identification Number (PIN) code by comparing the at least one of the biometric or the PIN code with at least one of a previously registered biometric associated with the user 102 or a previously registered PIN code associated with the user 102 that is stored in the authentication application server 110, and if the at least one of the biometric or the PIN code matches the at least one of the previously registered biometric associated with the user 102 or the previously registered PIN code associated with the user 102, the user private key is made available for executing at least one cryptographic operation. In some embodiments, the biometric of the user 102 may include: (i) a fingerprint scan of the user 102; (ii) a facial feature scan of the user 102; (iii) an iris scan of the user 102; and/or a retina scan of the user 102.

In some embodiments, the cryptographic operation execution module 212 responds to the at least one cryptographic challenge by performing the at least one cryptographic operation on the cryptographic challenge using the user private key to form a result of the at least one cryptographic operation. In some embodiments, the cryptographic operation execution module 212 transmits the result of the at least one cryptographic operation as a cryptographic challenge response to the authentication application server 110.

The application link invoke module 216 conditionally invokes the application link from the table to automatically redirect from the authentication application 104B to a target application specified in the target application link. In some embodiments, the target application specified in the target application link is the relying party application 104A.

In some embodiments, the application link invoke module 216 not redirected to the relying party application 104A when the relying party application 104A is being accessed from a browser in at least one of (i) the first user device 104 associated with the user 102 or (ii) the second user device 106 associated with the user 102. In some embodiments, the application link invoke module 216 not redirected to the relying party application 104A when the relying party application 104A is being accessed from the second user device 106 associated with the user 102.

Figure 3:
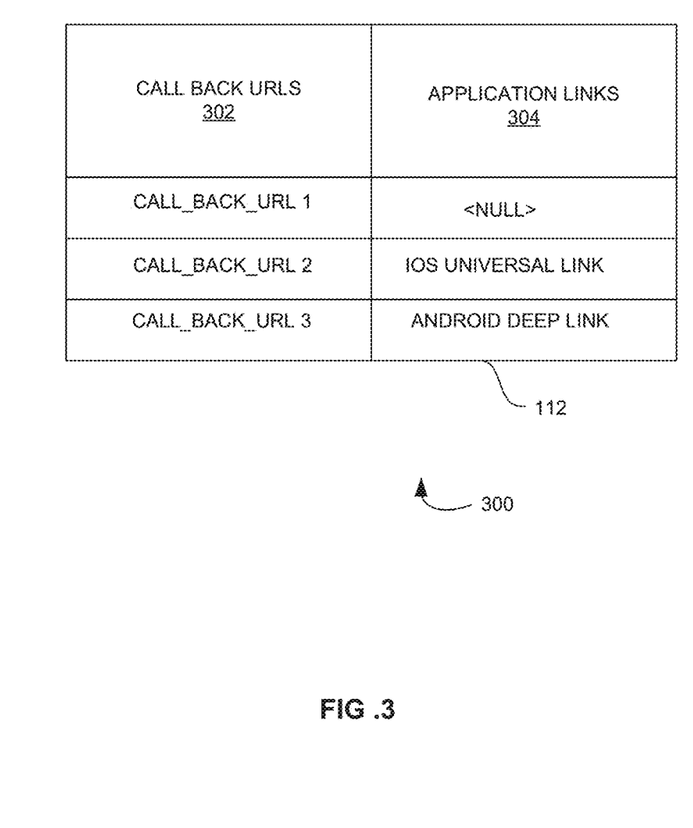
FIG. 3 is a diagram illustrating an embodiment of a table 300 having a mapping that is stored in the database 218 of the authentication application server 110 of FIG. 1.

FIG. 3 is a diagram illustrating an embodiment of a table 300 having a mapping that is stored in the database 218 of the authentication application server 110 of FIG. 1, according to some embodiments herein. The table 112 includes a mapping between (i) call back URLs 302 and (ii) application links 304. The call back URLs 302 include a call back URL 1, a call back URL 2 and a call back URL 3. The application links 304 include a null value, an iOS Universal Link and an Android Deep Link. In some embodiments, the relying party application 104A specifies the null value that corresponds the call back URL 1 in the table 112 if the relying party application 104A is being accessed from a browser in at least one of: (i) the first user device 104 associated with the user 102 or (ii) the second user device 106 associated with the user 102. In some embodiments, when the user 102 opens a web page which is matched as described, iOS automatically redirects the user 102 to the application. In some embodiments, the Android Deep Link is based on website URL that has been verified to belong to a website. In some embodiments, the Android Deep Link opens the application if the user 102 clicks the URL. The authentication application 104B retrieves at least one of (i) an application link, e.g., the iOS Universal Link or the Android Deep Link or (ii) the null value from the table 112 that corresponds to a call back URL, e.g., the call back URL 1, the call back URL 2 or the call back URL 3. The relying party application 104A creates a 1-1 mapping for each application link and the corresponding call back URL. In some embodiments, the relying party application 104A creates the 1-1 mapping for the call back URL and the corresponding application link.

Figure 4:
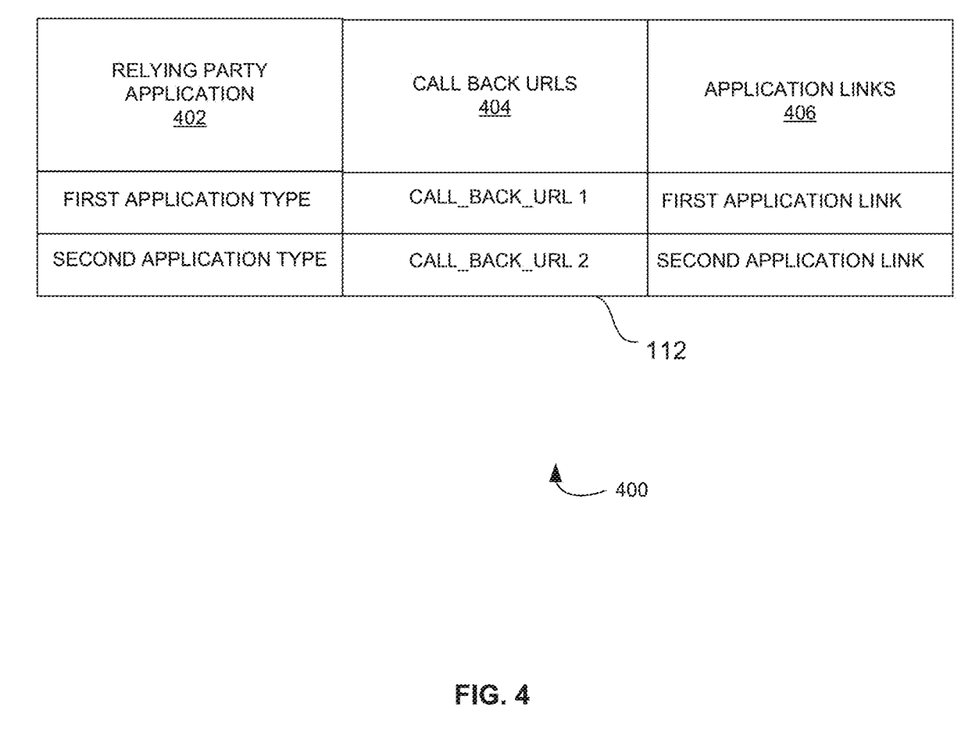
FIG. 4 is a diagram illustrating an embodiment of a table 400 having application links 406 that correspond to call back URLs 404 for application types.

FIG. 4 is a diagram illustrating an embodiment of a table 400 having application links 406 that correspond to call back URLs 404 for application types according to some embodiments herein. In some embodiments, a relying party application 402, e.g., Expedia, includes one or more application types, e.g., a first application type and a second application type. In one example, the relying party application 402 may be a travel application like Expedia, and the first application type may be an asset owner application that enables owners of hotels to list rooms that are available, and the second application type may be a room booking application that enables guests, e.g., the user 102 to book one or more rooms.

In some embodiments, the table 112 includes a first application link that corresponds to a first call back URL (e.g., for the first application type) and a second application link that corresponds to a second call back URL (e.g., for the second application type).

Figure 5:
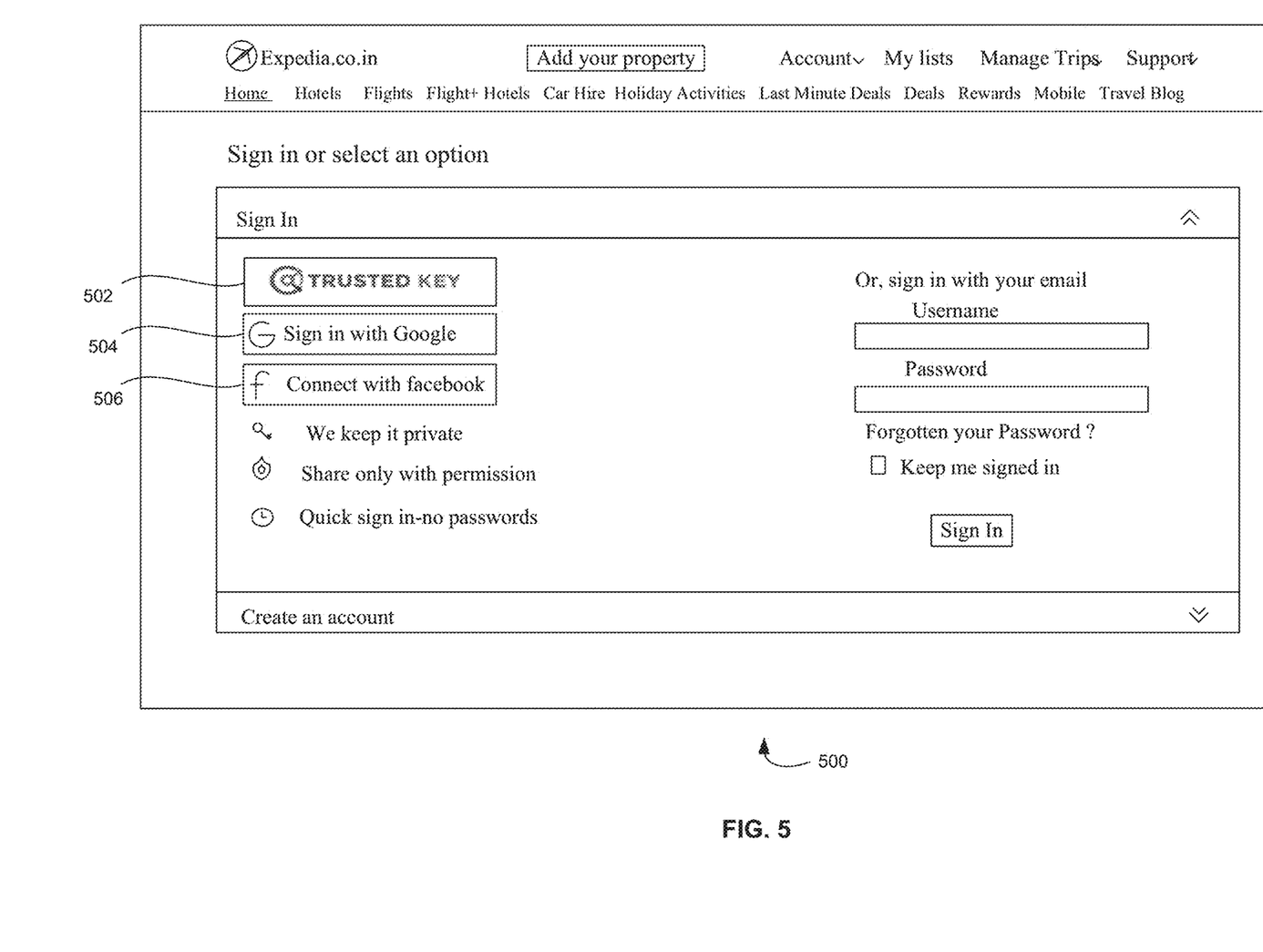
FIG. 5 is a diagram illustrating an embodiment of a screenshot of a user interface 500 of the relying party application 104A

FIG. 5 is a diagram illustrating an embodiment of a screenshot of a user interface 500 of the relying party application 104A according to some embodiments herein. The user interface 500 includes the user 102 logging on to the relying party application 104A, e.g., Expedia, using at least one of: (i) a username and a password; or (ii) the authentication application 104B, which may a Digital Identity Management (DIM) application 502 or a third-party application such as Gmail 504 or Facebook 506. In some embodiments, the relying party application 104A, e.g., Expedia, includes one or more application types, e.g., a first application type and a second application type. In some embodiments, the first application type may be an asset owner application that enables owners of hotels to login to the relying party application 104A, e.g., Expedia. In some embodiments, the second application type may be a room booking application that enables the user 102 to login to the relying party application 104A, e.g., Expedia. In some embodiments, the user 102 enters his/her username and password corresponding to an account which is previously created or registered by the user 102 at the relying party application 104A, e.g., Expedia to book hotel rooms, flight tickets, etc. In some embodiments, the user 102 clicks the Digital Identity Management (DIM) application 502 if the user 102 wants to login to the relying party application 104A, e.g., Expedia to book the hotel rooms, the flight tickets, etc. using the Digital Identity Management (DIM) application 502. In some embodiments, the user 102 clicks the third-party application such as Google Mail (Gmail) 504, or Facebook 506 if the user 102 wants to login to the relying party application 104A, e.g., Expedia to book the hotel rooms, the flight tickets, etc. using the third-party application such as Gmail 504 or Facebook 506. The relying party application 104A, e.g., Expedia makes an API call that includes an authentication request or authorization request initiated by the user 102. The application authentication server 110 sends an at least one authentication challenge to the authentication application 104B, e.g., the Digital Identity Management (DIM) application. In some embodiments, the user 102 receives the at least one authentication challenge from the authentication application server 110 at a corresponding account of the user 102 at the authentication application 104B, e.g., an account of the user 102 at the Digital Identity Management (DIM) application 502 or an account of the user 102 at the third-party application such as Gmail 504 or Facebook 506, etc. In some embodiments, the at least one authentication challenge is accepted or denied at the corresponding authentication application. In some embodiments, the user 102 provides a biometric or a PIN code at the authentication application 104B, e.g., the Digital Identity Management (DIM) application 502. In some embodiments, the authentication application 104B authenticates the user 102 by verifying the biometric or the PIN code with a previously registered biometric associated with the user 102 or a previously registered PIN code associated with the user 102. In some embodiments, the authentication application 104B automatically redirects or switches back from the authentication application 104B, e, g. the Digital Identity Management (DIM) application 502 to the relying party application 104A, e.g., Expedia once the authentication challenge is accepted or denied at the authentication application 104B.

Figure 6:
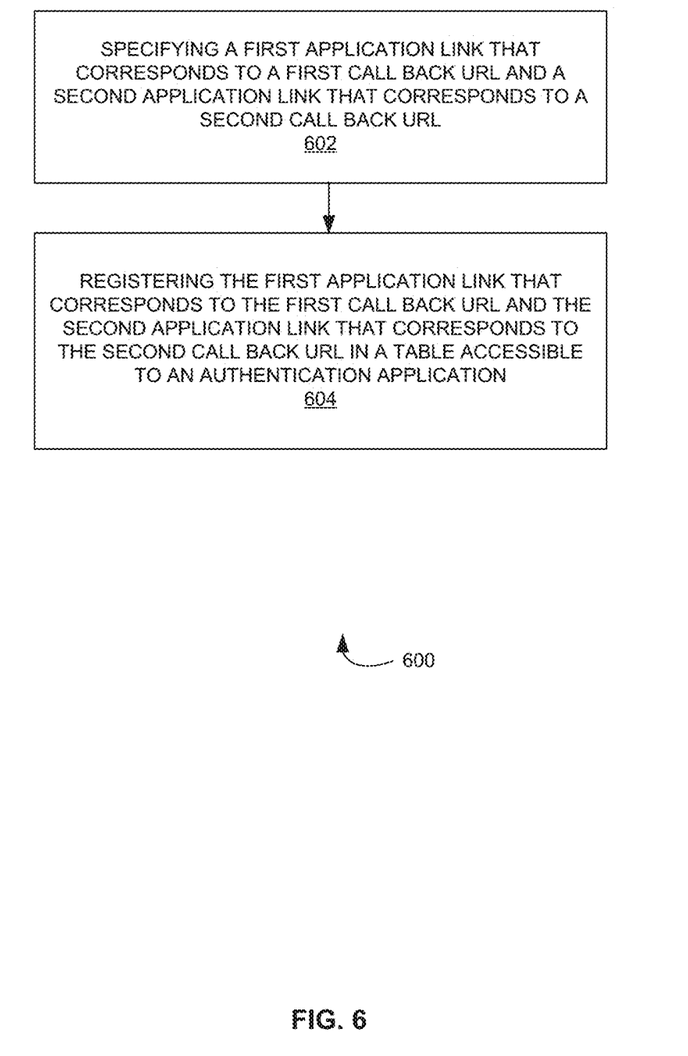
FIG. 6 is a flow diagram illustrating an embodiment of a method 600 for registering a target application with the authentication application 104B to enable automatically redirecting from the authentication application 104B.

FIG. 6 is a flow diagram illustrating an embodiment of a method 600 for registering a target application with the authentication application 104B to enable automatically redirecting from the authentication application 104B according to some embodiments herein. At step 602, the method 600 includes specifying a first application link that corresponds to a first call back URL and a second application link that corresponds to a second call back URL. At step 604, the method 600 incudes registering the first application link that corresponds to the first call back URL and the second application link that corresponds to the second call back URL in the table 112 accessible to the authentication application 104B.

Figure 7:
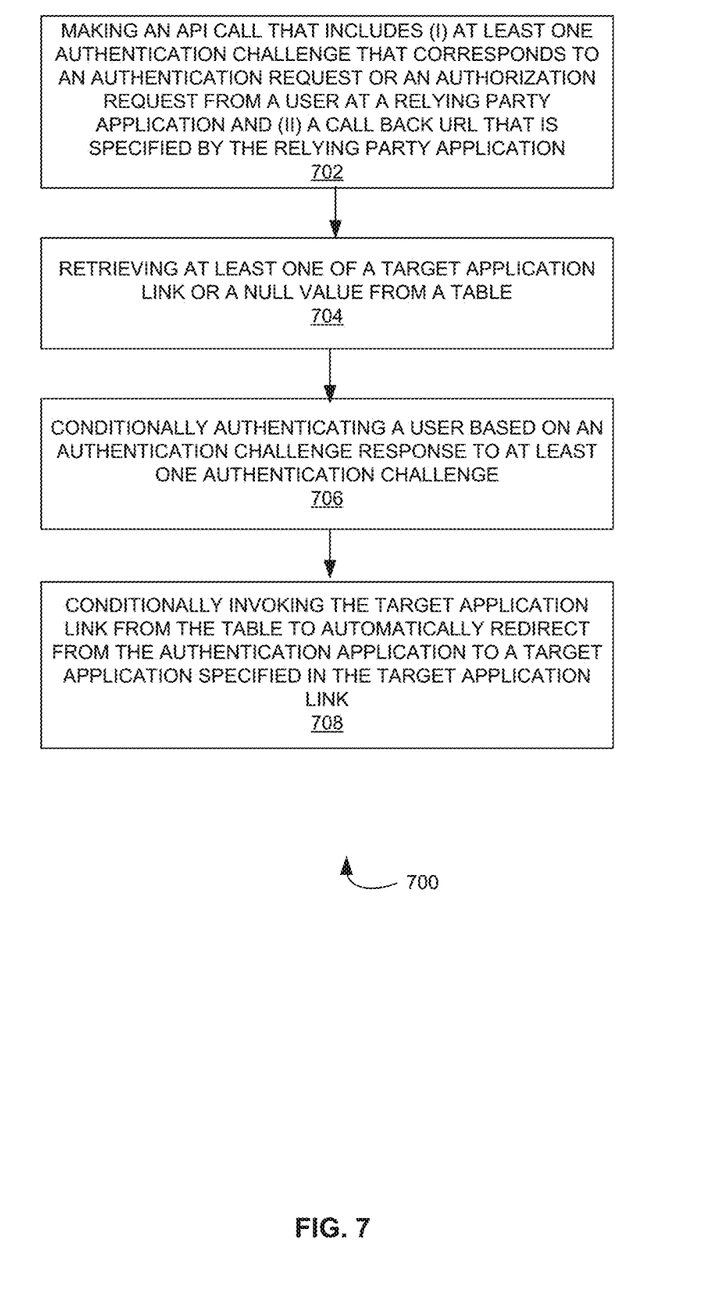
FIG. 7 is a flow diagram illustrating an embodiment of a method 700 for authenticating the user 102 at the relying party application 104A using the authentication application 104B and automatically redirecting from the authentication application 104B to a target application.

FIG. 7 is a flow diagram illustrating an embodiment a method 700 for authenticating the user 102 at the relying party application 104A using the authentication application 104B and automatically redirecting from the authentication application 104B to a target application according to some embodiments herein. At step 702, the method 700 includes making an API call that includes (i) at least one authentication challenge that corresponds to an authentication or an authorization request from the user 102 at the relying party application 104A and (ii) a call back URL that is specified by the relying party application 104A. At step 704, the method 700 includes retrieving at least one of a target application link or a null value from the table 112. The target application link or the null value corresponds to the call back URL. At step 706, the method 700 incudes conditionally authenticating the user 102 based on an authentication challenge response to the at least one authentication challenge. The conditionally authenticating includes at least one of approving or denying the authentication request or the authorization request. At step 708, the method 700 includes conditionally invoking the target application link from the table 112 to automatically redirect from the authentication application 104B to the target application specified in the target application link.

Figure 8:
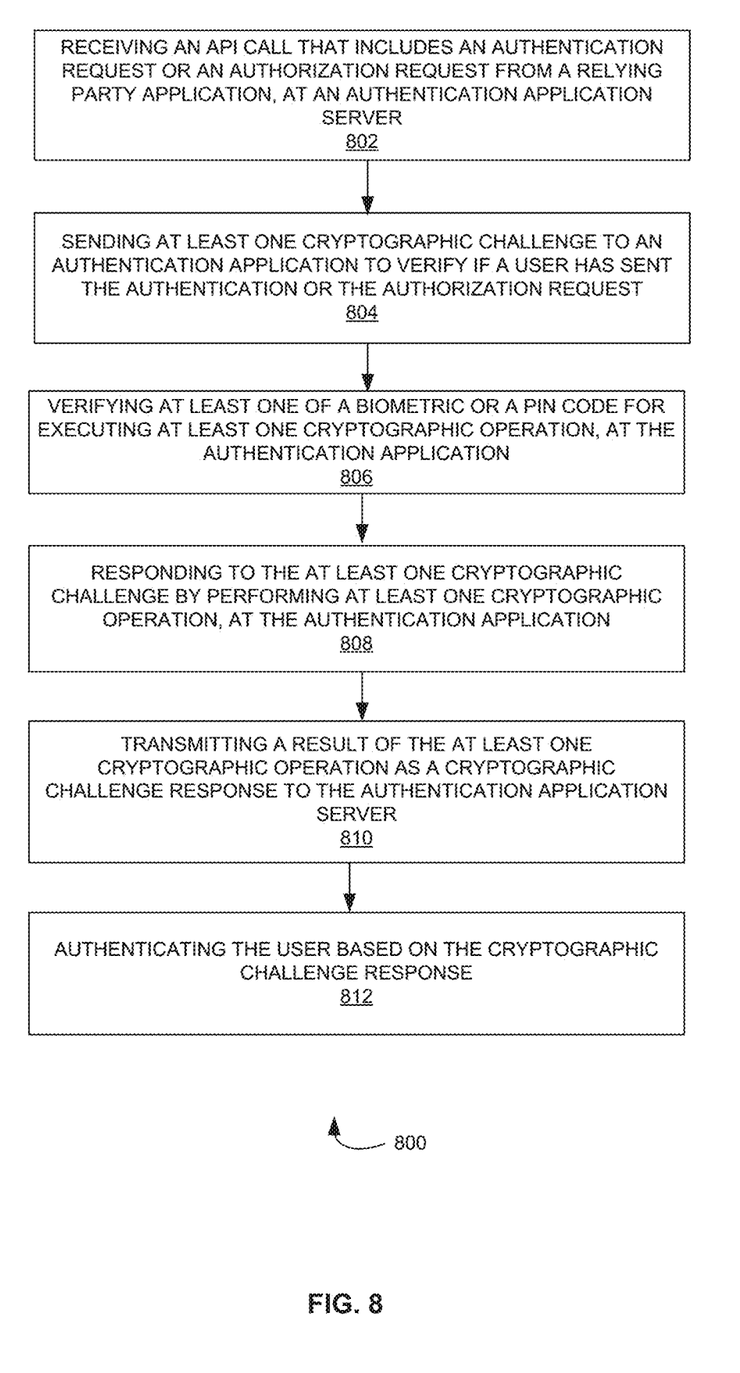
FIG. 8 is a flow diagram illustrating an embodiment of a method for conditionally authenticating the user 102 at the authentication application 104B.

FIG. 8 is a flow diagram illustrating an embodiment of a method for conditionally authenticating the user 102 at the authentication application 104B according to some embodiments herein. At step 802, the method 800 includes receiving an API call that includes an authentication request or an authorization request from the relying party application 104A, at the authentication application server 110. At step 804, the method 800 includes sending at least one cryptographic challenge to the authentication application 104B to verify if the user 102 has sent the authentication or the authorization request. At step 806, the method 800 includes verifying at least one of a biometric or a PIN code by comparing the at least one of the biometric or the PIN code with at least one of a previously registered biometric associated with the user 102 or a previously registered PIN code associated with the user 102, and if the at least one of the biometric or the PIN code matches the at least one of the previously registered biometric associated with the user 102 or the previously registered PIN code associated with the user 102, making the user private key available for executing at least one cryptographic operation, at the authentication application 104B. At step 808, the method 800 includes responding the at least one cryptographic challenge by performing the at least one cryptographic operation on the cryptographic challenge using the user private key to form a result of the at least one cryptographic operation, at the authentication application 104B. At step 810, the method 800 includes transmitting the result of the at least one cryptographic operation as a cryptographic challenge response to the authentication application server 110. At step 812, the method 800 includes authenticating the user 102 based on the cryptographic challenge response.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
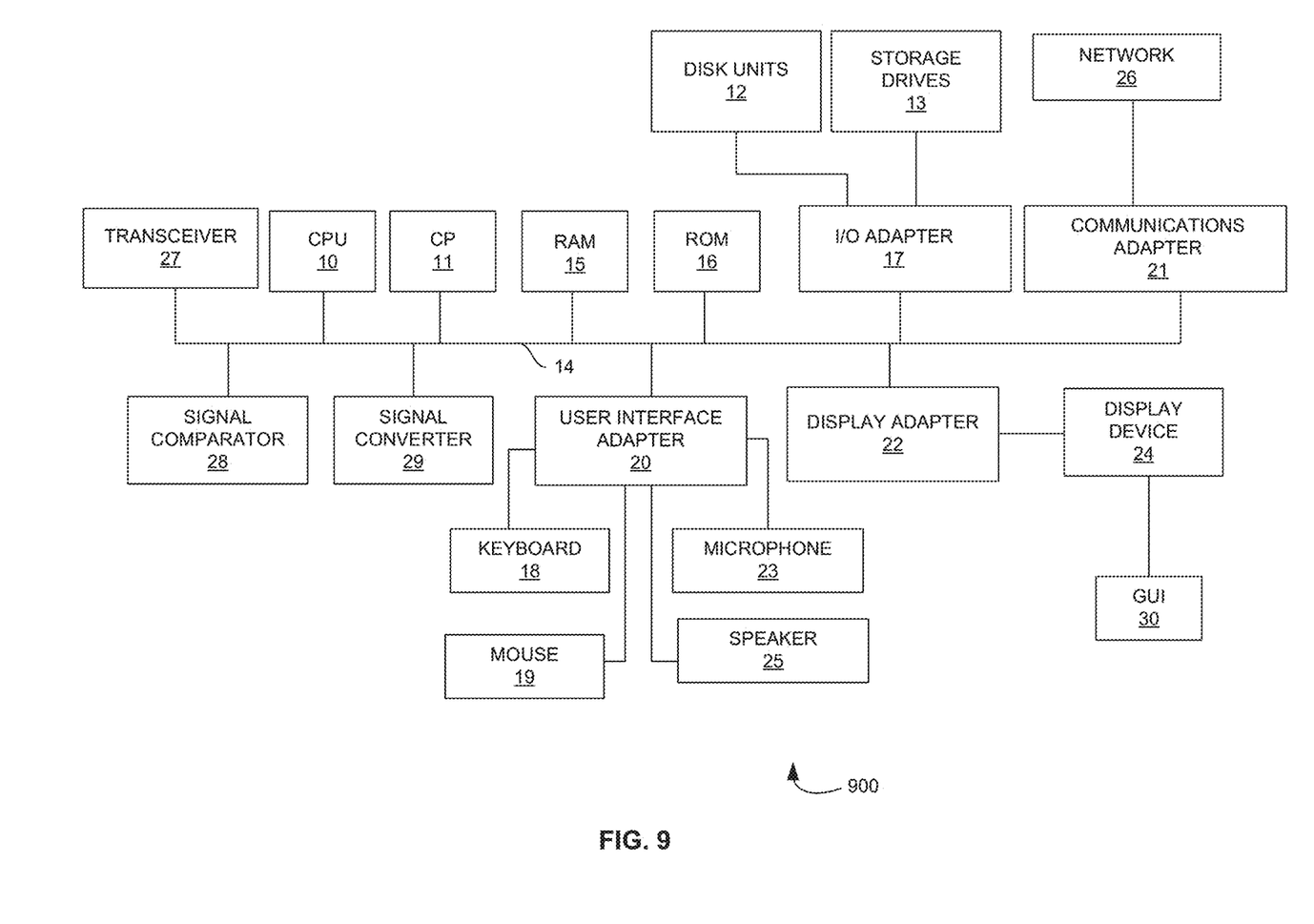
FIG. 9 is a diagram illustrating an embodiment of a hardware configuration of a server/computer system/user device.

A representative hardware environment for practicing the embodiments herein is depicted in FIG. 9, with reference to FIGS. 1 through 8. FIG. 9 is a diagram illustrating an embodiment of a hardware configuration of a server/computer system/user device 900 in accordance with the embodiments herein. The server includes at least one processing device (CPU 10). The server also includes special-purpose processors (CPs 11) that are interconnected via system bus 14 to various devices such as a random access memory (RAM) 15, read-only memory (ROM) 16, and an input/output (I/O) adapter 17. The I/O adapter 17 can connect to peripheral devices, such as disk units 12 and storage drives 13, or other program storage devices that are readable by the system. The server can read the inventive instructions on the program storage devices and follow these instructions to execute the methodology of the embodiments herein. The server further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

Figure 10:
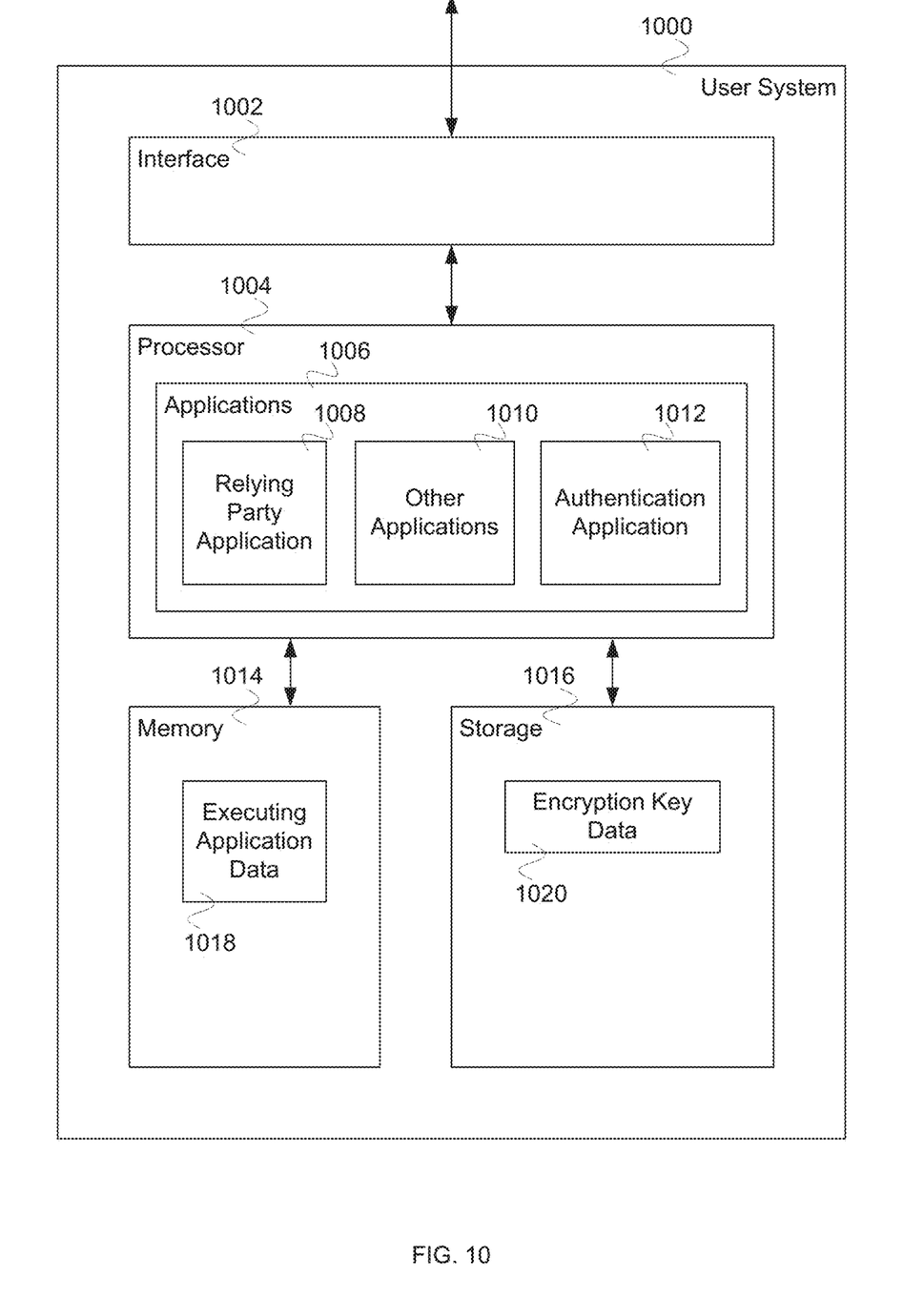
FIG. 10 is a block diagram illustrating an embodiment of a user system.

FIG. 10 is a block diagram illustrating an embodiment of a user system. For example, user system 1000 comprises first user device 104 of FIG. 1 or second user device 106 of FIG. 1. In the example shown, user system 1000 comprises interface 1002. Interface 1002 comprises an interface to processor 1004. For example, interface 1002 comprises an interface for receiving user interactions, providing user interface data, communicating with other systems, receiving a request to access using an authentication application, etc. Processor 1004 comprises a processor for processing data. Processor 1004 executes applications 1006. Applications 1006 comprise relying party applications 1008, other applications 1010, and authentication applications 1012. For example, processor 1004 grants a selected application of applications 1006 interactive control (e.g., provides output from the selected application for display, grants the selected application access to user input devices, provides primary processor focus to the selected application, etc.). Applications 1006 comprise an application for use by a user, for example, a banking application, a gaming application, a web browser application, etc. For example, applications 1006 comprise an application requiring authentication (e.g., authenticating by proving identity or biographical information). Processor 1004 grants interactive control to applications 1006 (e.g., in response to a user indication to execute applications 1006). A user provides a request to applications 1006 (e.g., via interface 1002) to authenticate using an authentication application (e.g., authentication application 1012). Applications 1006 provide a request for authentication that includes an indication of a target application. The target application comprises a destination application for interactive control redirect after authentication. For example, the target application comprises the user application or an application of other applications 1006.

In response to the request to authenticate, processor 1004 redirects interactive control from an application of applications 1006 to authentication application 1012 and provides an indication of interactive control to applications 1006. The indication of interactive control additionally comprises the indication to authenticate. Authentication application 1012 receives the indication of interactive control comprising the indication to authenticate, authenticates the user, and in the event the user is authenticated indicates to redirect interactive control to the target application. Other applications 1010 comprises any other appropriate applications, for example, a document processing application, a chat application, a social media application, a web browser application, etc. Storage 1016 comprises encryption key data 1020 (e.g., a private encryption key, a public encryption key, a recovery encryption key, a local encryption key, an identifier document key, etc.). Encryption key data 1020 is private to authentication application 1012 and not accessible by any other application. Memory 1014 comprises executing application data 1018 comprising data associated with applications 1006.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor-implemented method executed on a first user device associated with a user for authenticating the user at a relying party application associated with a relying party using an authentication application and automatically redirecting from the authentication application to a target application, the method comprising:
    making an API call that comprises (i) at least one authentication challenge that corresponds to an authentication request or an authorization request from the user at the relying party application and (ii) a call back URL that is specified by the relying party application;
    retrieving at least one of a target application link or a null value from a table, wherein the target application link or the null value corresponds to the call back URL, wherein the table comprises a first application link that corresponds to a first call back URL, a second application link that corresponds to a second call back URL and the null value that corresponds a third call back URL;
    authenticating the user based on an authentication challenge response to the at least one authentication challenge, wherein authenticating comprises at least one of approving or denying the authentication request or the authorization request; and
    invoking the target application link from the table to automatically redirect from the authentication application to the target application specified in the target application link.

2. The processor-implemented method of claim 1, wherein the at least one authentication challenge is at least one of (i) a username and a password of the user or (ii) at least one cryptographic challenge.

3. The processor-implemented method of claim 1, wherein the target application link is at least one of (i) an iOS Universal Link if the target application is an iOS application, or (ii) an Android Deep Link if the target application is an Android application.

4. The processor-implemented method of claim 1, wherein the target application specified in the target application link is the relying party application.

5. The processor-implemented method of claim 4, wherein the relying party application makes the API call based on an authentication protocol layered on an authorization protocol, wherein the authorization protocol comprises the call back URL and at least one parameter, wherein the at least one parameter is selected from (i) an API authorization endpoint, (ii) a client ID, (iii) a response type and (iv) a scope.

6. The processor-implemented method of claim 2, wherein the authentication application responds to the at least one cryptographic challenge by:
  receiving the at least one cryptographic challenge at the authentication application; and
  verifying at least one of a biometric or a PIN code, at the authentication application, by comparing the at least one of the biometric or the PIN code with at least one of a previously registered biometric associated with the user or a previously registered PIN code associated with the user, and if the at least one of the biometric or the PIN code matches the at least one of the previously registered biometric associated with the user or the previously registered PIN code associated with the user, making a user private key available for executing at least one cryptographic operation on a cryptographic challenge of the at least one cryptographic challenge.

7. The processor-implemented method of claim 6, further comprising:
  responding to the at least one cryptographic challenge by performing the at least one cryptographic operation on the cryptographic challenge using the user private key to form a result of the at least one cryptographic operation, at the authentication application; and
  transmitting the result of the at least one cryptographic operation as the cryptographic challenge response, wherein the result is derived from or includes a pseudorandom value.

8. The processor-implemented method of claim 6, wherein receiving the at least one cryptographic challenge comprises receiving a pseudorandom value, performing the at least one cryptographic operation on the cryptographic challenge for responding to the at least one cryptographic challenge comprises signing the pseudorandom value with the user private key, and the result of the of the at least one cryptographic operation performed on the cryptographic challenge comprises a signed pseudorandom value.

9. The processor-implemented method of claim 1, wherein the authentication application is not redirected to the relying party application when the API call comprises the third call back URL that corresponds to the null value in the table.

10. One or more non-transitory computer readable storage mediums storing one or more sequences of instructions, which when executed by one or more processors, causes a method executed on a first user device associated with a user for authenticating the user at a relying party application associated with a relying party using an authentication application and automatically redirecting from the authentication application to a target application by performing the steps of:
  making an API call that comprises (i) at least one authentication challenge that corresponds to an authentication request or an authorization request from the user at the relying party application and (ii) a call back URL that is specified by the relying party application;
  retrieving at least one of a target application link or a null value from a table, wherein the target application link or the null value corresponds to the call back URL, wherein the table comprises a first application link that corresponds to a first call back URL, a second application link that corresponds to a second call back URL and the null value that corresponds a third call back URL;
  authenticating the user based on an authentication challenge response to the at least one authentication challenge, wherein authenticating comprises at least one of approving or denying the authentication request or the authorization request; and
  invoking the target application link from the table to automatically redirect from the authentication application to the target application specified in the target application link.

11. The one or more non-transitory computer readable storage mediums storing the one or more sequences of instructions of claim 10, wherein the at least one authentication challenge is at least one of (i) a username and a password of the user or (ii) at least one cryptographic challenge.

12. The one or more non-transitory computer readable storage mediums storing the one or more sequences of instructions of claim 10, which when executed by one or more processors, further causes determining the target application specified in the target application link.

13. The one or more non-transitory computer readable storage mediums storing the one or more sequences of instructions of claim 12, wherein the target application link is at least one of (i) an iOS Universal Link if the target application is an iOS application, or (ii) an Android Deep Link if the target application is an Android application.

14. The one or more non-transitory computer readable storage mediums storing the one or more sequences of instructions of claim 10, wherein the target application specified in the target application link is the relying party application.

15. A system comprising:
  a device processor; and
  a non-transitory computer readable storage medium storing one or more sequences of instructions, which when executed by the device processor, causes a method executed on a first user device associated with a user for authenticating the user at a relying party application associated with a relying party using an authentication application and automatically redirecting from the authentication application to a target application by performing the steps of:
  making an API call that comprises (i) at least one authentication challenge that corresponds to an authentication request or an authorization request from the user at the relying party application and (ii) a call back URL that is specified by the relying party application;
  retrieving at least one of a target application link or a null value from a table, wherein the target application link or the null value corresponds to the call back URL, wherein the table comprises a first application link that corresponds to a first call back URL, a second application link that corresponds to a second call back URL and the null value that corresponds a third call back URL;
  authenticating the user based on an authentication challenge response to the at least one authentication challenge, wherein authenticating comprises at least one of approving or denying the authentication request or the authorization request; and
  invoking the target application link from the table to automatically redirect from the authentication application to the target application specified in the target application link.

* * * * *

UNITED STATES PATENT AND TRADEMARK OFFICE
CERTIFICATE OF CORRECTION

| | | |
|---|---|---|
| PATENT NO. | : 11,381,405 B1 | |
| APPLICATION NO. | : 16/854466 | |
| DATED | : July 5, 2022 | |
| INVENTOR(S) | : Prakash Sundaresan et al. | |

It is certified that error appears in the above-identified patent and that said Letters Patent is hereby corrected as shown below:

In the Specification

Column 4, Line 59, delete "embodiment s" and insert --embodiments--, therefor.

Signed and Sealed this
Thirty-first Day of January, 2023

Katherine Kelly Vidal
*Director of the United States Patent and Trademark Office*